Feb. 14, 1967    F. J. ADAMS    3,303,754
POWER OPERATED STEERING GEAR
Filed March 10, 1965
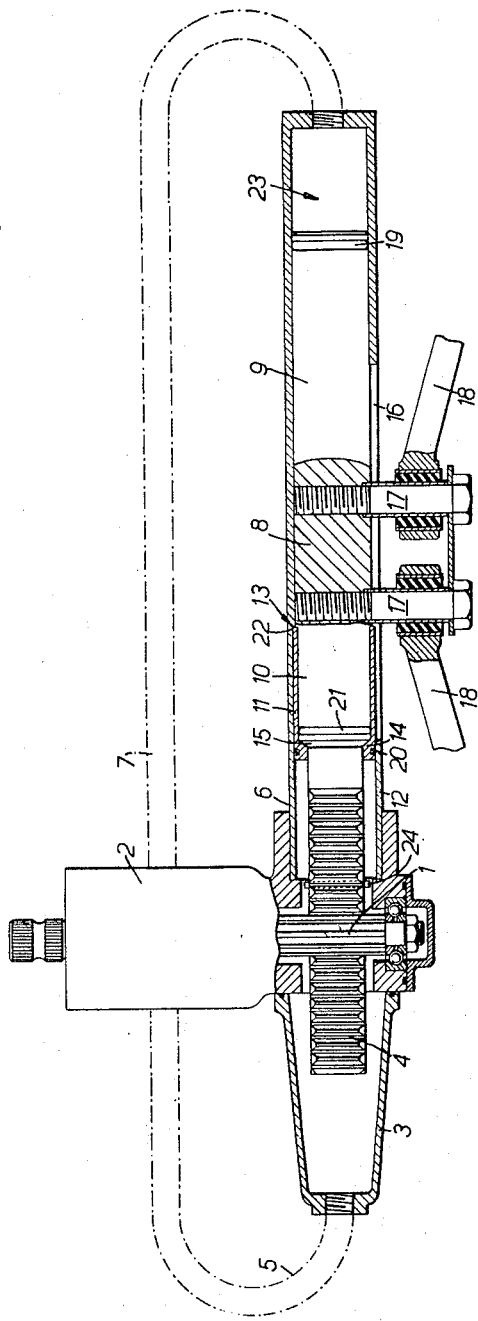
INVENTOR
Frederick J. Adams
BY
Baldwin & Wight
ATTORNEYS United States Patent Office 3,303,754
Patented Feb. 14, 1967

3,303,754
POWER OPERATED STEERING GEAR
Frederick J. Adams, Houghton Regis, near Dunstable, England, assignor to Hydrosteer Limited, Bedfordshire, England
Filed Mar. 10, 1965, Ser. No. 438,646
11 Claims. (Cl. 91—462)

This invention relates to steering mechanism for vehicles of the kind comprising a rack and pinion and a fluid operated power unit which provides power assistance to the manual steering effort applied to the pinion.

According to the present invention in a steering mechanism of the rack and pinion type the rack is connected to a piston unit operating in the cylinder of a double-acting fluid operated ram, the piston unit being constructed for connection to the steering assembly through an opening in the wall of the cylinder, means being included for increasing the length of cylinder wall sealed between the operative ends of the piston unit when the piston unit moves in a given direction in a predetermined portion of the cylinder.

Thus the cylinder unit is sealed on either side of the opening for the steering connection but the means for increasing the length of the cylinder wall sealed between the operative ends of the piston unit enables the piston unit to be of basically shorter dimensions than is necessary to seal the opening for the full movement of the steering connection in the opening, and thus the overall dimensions of the cylinder can be reduced. This reduction is particularly advantageous in modern automobile construction in which it is important to reduce weight and the space occupied by the operating components. It will be appreciated that the operating fluid from the power means will be applied to each side of the piston unit.

According to another aspect of the present invention the construction of the piston unit and the rack is such that the axial distance moved by one operative end of the piston unit is less than the axial distance moved by the part of the piston unit which carries the steering connection when the rack is moved from one end position to a predetermined mid-position and vice versa.

Conveniently part of the rack may be arranged to enter the piston unit when the mechanism is operated, and this portion of the rack may thus overlap the opening in the cylinder. It will be seen therefore that the shortening in the length of the cylinder may be approximately equal to the amount of overlap of the rack and the opening in the cylinder, which could not be achieved if the piston unit was of the normal type and merely connected to the end of the rack.

Preferably the rack and pinion unit is housed within the cylinder of the double acting ram and part of the rack may provide at least part of the operative pressure surface on one side of the piston unit.

In a preferred construction a piston unit comprises a piston component part of which can slide in sealing engagement within the bore of a sleeve, means being provided to limit the axial movement of the sleeve in the cylinder when part of the sleeve overlaps the opening in the wall thereof.

The sleeve may be arranged to move in a portion of the bore of a cylinder which is of increased diameter, the end of said increased portion providing a stop to limit the axial movement of the sleeve, and sealing means may be provided between the sleeve and the bore of the cylinder at a point on the sleeve which is displaced from the opening in the cylinder when the sleeve is at its limiting position therein, sealing means also being provided between the piston component and the cylinder which are displaced from the opening therein when the piston component is displaced to its maximum towards the sleeve.

The end of the sleeve adjacent its seal with the cylinder preferably has an internal abutment which can be engaged by an abutment surface on the piston component to move the sleeve away from its limiting position in a direction towards the rack and pinion unit, and a sealing member may be provided between the piston component and the sleeve adjacent the abutment surface thereon.

Preferably the sleeve is arranged at the end of the piston unit adjacent the rack and pinion unit and the rack may thus be arranged to enter the sleeve when the piston component carrying the connection to the steering assembly approaches a position remote from the rack and the pinion unit.

If desired the rack may be arranged at any angle to the pinion associated with it and preferably the piston unit carries a pair of connections which extend through the opening in the wall of the cylinder for connection to the steering assembly.

The invention may be performed in various ways but one specific embodiment will now be described by way of example and with reference to the accompanying drawing.

The steering mechanism as shown comprises a rack and pinion unit 1 of known type arranged within a suitable housing 2 which also carries a hydraulic fluid control valve (not shown). The control valve may also be of known type and operates to control the flow of hydraulic fluid to either end of a cylinder in which is arranged a piston unit so that the whole operates as a double acting fluid operated ram.

One end of the housing 2 for the rack and pinion unit is provided with an extension 3 into which part of the rack 4 can move and to which one side of the fluid from the valve is directed via a conduit, e.g. pipe line 5. Also arranged on the rack and pinion housing 2 is a cylindrical member 6 which is axially in line with the extension 3 referred to and into which the other end of the rack 4 can move. This cylindrical member 6 provides the cylinder of the double acting fluid actuated ram and thus the other side of the fluid from the valve is ducted via a conduit, e.g. pipe line 7 to the end of the cylinder remote from the rack and pinion unit.

Arranged within the cylinder member 6 is a piston unit 8 which comprises a piston component 9 which is a sliding fit in the cylinder 6 and the end 10 of which adjacent to the rack 4 is of slightly reduced diameter. This end 10 of reduced diameter is rigidly connected to the adjacent end of the rack 4 and is surrounded by a sleeve 11 within which it is free to slide. The sleeve itself is also arranged to slide within the cylinder 6 but in a portion 12 thereof which is of increased diameter, movement of the sleeve 11 in a direction away from the rack and pinion unit 1 being limited by an annular stop 13 at the junction of the cylinder portion 12 of increased internal diameter and the cylinder portion of lesser internal diameter. The end of the sleeve 11 adjacent the rack and pinion unit 1 has an inturned flange 14 which can abut against the end surface 15 of the piston component 9, both flange and piston component being chamfered where they engage to provide a pair of abutment surfaces.

An opening 16 is provided in the lower part of the wall of the cylinder member 6 in the form of an elongated slot through which a pair of bolts 17 can extend into the piston component 9 which can be suitably bushed to carry a pair of track rods 18 from the steering assembly of the vehicle. The bolts 17 and track rods 18 provide steering motion transmitting connections between the piston unit 8 and the vehicle steering assembly, not shown. The position of the bolts 17 in the piston component 9 is such that when the bolts are displaced towards the end of the opening 16 adjacent the rack and pinion unit 1, the end of the piston component 9 remote therefrom is still within the part of the bore of the cylinder member which is not pierced by the opening 16. Similarly when the bolts are displaced to the other end of the slot, remote from the rack and pinion unit, although the end 10 of the piston component 9 adjacent the rack does overlap the slot (as shown in the drawing), the end of the sleeve 11 in which it moves does not. A sealing ring 19 is therefore provided between the piston component 9 and the wall of the cylinder in that part of the piston component which remains in the cylinder when the bolts are adjacent one end of the slot, and a similar sealing ring 20 is arranged between the sleeve 11 and the wall of the cylinder member in that part of the sleeve which remains in the bore of the cylinder member and does not overlap the slot when the bolts are at the other end of the slot. A sealing ring 21 is also provided adjacent the chamfered end of the piston component where it moves within the sleeve.

In operation therefore with the rack 4 of the rack and pinion unit 1 in a mid-position (as shown) the sleeve 11 is extended to its maximum position away from the rack and pinion unit 1 with its end 22 abutting the stop 13 at the end of the increased bore portion 12 in the cylinder component. In this position, the flange 14 of the sleeve 11 also abuts the end of the reduced portion 10 of the cylinder component which the sleeve surrounds, that is to say the abutment faces between the sleeve flange 14 and the chamfered end 15 of the piston component are in engagement. Also, the other end of the piston component 9 is displaced from the end of the cylinder member so that there is a fluid operating space 23 between them. Movement of the rack 4 by the pinion in a direction towards the cylinder member 6 now causes the piston component 9 together with its connection to the steering assembly to move away from the rack and pinion unit 1 and at the same time the valve unit operates to supply power fluid to pipe line 5 to the extension 3 on the rack and pinion unit housing 2. Power fluid now surrounds the rack 4 and acts upon it so that the chamfered end 15 of the piston component 9 moves away from its abutment surface on the sleeve 11 which is prevented from moving by the stop 13, and the other end of the piston component moves to a point in which it is adjacent the end of the cylinder member. It will be appreciated that the rack 4 will now extend into the sleeve 11 and overlap the opening 16 in the wall of the cylinder member.

When the rack 4 is moved in the other direction, away from the mid-point as shown in the drawing, the hydraulic power fluid will be supplied by pipe line 7 to the end of the cylinder member remote from the rack and pinion unit 1 so that it acts against the sealed end of the piston component 9 and helps to move the piston unit 8 in a direction towards the rack and pinion unit. With this movement the sleeve 11 is carried along the bore in the cylinder member by the chamfered abutment surfaces between the sleeve and the piston component until the connection bolts reach the end of the slot.

In order to assist in the return of the sleeve 11 to its central position from the position set forth above a pin 24 is included in the rack bar which can engage the sleeve when the rack bar has moved a predetermined distance into the sleeve.

It will be appreciated that the distance between the sealing rings 20, 19 carried by the sleeve and the piston component which act against the inner walls of the cylinder member 6 increases or decreases depending upon the direction of movement of the rack 4 so that the rack itself can extend over the opening 16 in the cylinder member without the seal between the piston unit 8 and the bore of the cylinder member being broken and thus the operative lengths of both the piston assembly and the cylinder member can be reduced. Similarly the axial distance moved by one operative end of the piston unit in the form of the end flange 14 of the sleeve is less than the axial distance moved by the connection bolts 17.

If required the end of the sleeve 11 need not abut the end of the enlarged portion 12 of the cylinder member bore when the rack is in its mid-position, and it will also be appreciated that it is possible to construct a steering mechanism according to the invention in which the sleeve is arranged at the end of the piston component remote from the rack and pinion unit.

What I claim is:

1. In a steering mechanism for vehicles, a cylinder having a wall formed with an opening extending longitudinally of the cylinder axis; a double acting piston unit mounted for reciprocation in said cylinder; fluid pressure seals between the inside of said cylinder wall and opposite end portions of said piston unit; means for increasing the operative length of the cylinder wall sealed between said seals when said piston unit moves in a given direction in a predetermined portion of said cylinder; a rack connected to said piston unit within said cylinder; a pinion meshing with said rack and being operable for moving said rack longitudinally in said cylinder, said pinion constituting the input component of a rack and pinion mechanism and said rack constituting the output component of said rack and pinion mechanism; means including conduit means for delivering fluid under pressure into said cylinder at opposite ends of said piston unit thereby to provide power assistance to movement of said rack; and steering motion transmission means connected to said piston unit and rack and extending through said cylinder wall opening and being movable in said opening longitudinally of the cylinder axis.

2. A steering mechanism according to claim 1 in which the construction of the piston unit and the rack are such that the axial distance moved by one operative end of the piston unit is less than the axial distance moved by the part of the piston unit to which said steering motion transmission means is connected when the rack is moved from one end position to a predetermined mid-position and vice versa.

3. A steering mechanism according to claim 1 in which part of the rack can enter the piston unit when the mechanism is operated and overlap the opening in the cylinder.

4. A steering mechanism according to claim 1 in which the rack and pinion unit is housed within the cylinder of the double acting ram.

5. A steering mechanism according to claim 1 in which part of the rack provides at least part of the operative pressure surface on one side of the piston unit.

6. A steering mechanism according to claim 1 in which the piston unit comprises a sleeve and a piston component, part of which can slide in sealing engagement within the bore of said sleeve.

7. A steering mechanism according to claim 6 in which said cylinder has a bore portion of increased diameter in which said sleeve is movable, an end of said increased diameter portion providing a stop to limit the axial movement of the sleeve.

8. A steering mechanism according to claim 6 in which sealing means are provided between the sleeve and the bore of the cylinder at a point on the sleeve which is displaced from the opening in the cylinder when the sleeve is at its limiting position therein, and sealing means are also provided between the piston and the cylinder which are displaced from the opening therein when the piston component is displaced to its maximum towards the sleeve.

9. A steering mechanism according to claim 8 in which the end of the sleeve adjacent its seal with the cylinder has an inturned abutment which can be engaged by an abutment surface on the piston component to move the sleeve away from its limiting position in a direction towards the rack and pinion unit.

10. A steering mechanism according to claim 9 in which a sealing member is provided between the piston component and the sleeve.

11. A steering mechanism according to claim 6 in which the sleeve is arranged at the end of the piston unit adjacent the rack and pinion unit.

References Cited by the Examiner

UNITED STATES PATENTS

| | | | |
|---|---|---|---|
| 812,840 | 2/1906 | Field et al. | 92—52 |
| 1,872,714 | 8/1932 | Farley | 91—375 |
| 2,364,741 | 12/1944 | Merchant | 92—52 |
| 2,681,581 | 6/1954 | Pearson | 92—136 |
| 2,936,739 | 5/1960 | Levensteins et al. | 92—136 |

MARTIN P. SCHWADRON, *Primary Examiner.*

PAUL E. MASLOUSKY, *Examiner.*